United States Patent
Ball et al.

(10) Patent No.: US 9,887,428 B2
(45) Date of Patent: Feb. 6, 2018

(54) CO-TOLERANT CATALYST FOR PAFC

(71) Applicant: JOHNSON MATTHEY FUEL CELLS LIMITED, London (GB)

(72) Inventors: Sarah Caroline Ball, Oxon (GB); Brian Ronald Charles Theobald, Berkshire (GB); Silvain Buche, Berkshire (GB)

(73) Assignee: Johnson Matthey Fuel Cells Limited, London (GB)

( * ) Notice: Subject to any disclaimer, the term of this patent is extended or adjusted under 35 U.S.C. 154(b) by 0 days.

(21) Appl. No.: 14/765,349

(22) PCT Filed: Jan. 29, 2014

(86) PCT No.: PCT/GB2014/050226
§ 371 (c)(1),
(2) Date: Aug. 3, 2015

(87) PCT Pub. No.: WO2014/122426
PCT Pub. Date: Aug. 14, 2014

(65) Prior Publication Data
US 2015/0380758 A1 Dec. 31, 2015

(30) Foreign Application Priority Data
Feb. 5, 2013 (GB) .................................. 1302016.9

(51) Int. Cl.
*H01M 8/103* (2016.01)
*B01J 23/648* (2006.01)
(Continued)

(52) U.S. Cl.
CPC ......... *H01M 8/103* (2013.01); *B01J 23/6486* (2013.01); *H01M 4/921* (2013.01); *H01M 4/925* (2013.01); *H01M 8/086* (2013.01); *B01J 35/0033* (2013.01); *H01M 4/928* (2013.01); *H01M 2004/8684* (2013.01)

(58) Field of Classification Search
CPC ...... H01M 8/103; H01M 8/086; H01M 4/921; H01M 4/925; H01M 4/928; H01M 2004/8684
See application file for complete search history.

(56) References Cited

U.S. PATENT DOCUMENTS

| 4,175,055 A | 11/1979 | Goller et al. |
| 4,185,131 A | 1/1980 | Goller et al. |

(Continued)

FOREIGN PATENT DOCUMENTS

| CN | 101064368 A | 10/2007 |
| CN | 102804467 A | 11/2012 |

(Continued)

OTHER PUBLICATIONS

International Search Report and Written Opinion of the International Searching Authority PCT/GB2014/050226 dated May 16, 2014.

*Primary Examiner* — Jane Rhee
(74) *Attorney, Agent, or Firm* — Baker & Hostetler LLP

(57) ABSTRACT

A binary alloy catalyst comprising platinum and tantalum, wherein the tantalum is present in the alloy at 15 to 50 atomic % and a phosphoric acid fuel cell comprising such a catalyst is disclosed. The catalyst provides a better CO tolerance.

12 Claims, 1 Drawing Sheet

(51) Int. Cl.
  *H01M 8/086*  (2016.01)
  *H01M 4/92*  (2006.01)
  *B01J 35/00*  (2006.01)
  *H01M 4/86*  (2006.01)

(56)  References Cited

U.S. PATENT DOCUMENTS

| | | | |
|---|---|---|---|
| 5,183,713 A * | 2/1993 | Kunz | B01J 23/6486 |
| | | | 429/452 |
| 2006/0172179 A1 | 8/2006 | Gu et al. | |
| 2008/0233465 A1* | 9/2008 | Mizutani | B01J 23/6486 |
| | | | 429/431 |
| 2009/0137388 A1 | 5/2009 | Yoshida et al. | |
| 2010/0112391 A1* | 5/2010 | Salloum | H01M 8/023 |
| | | | 429/455 |
| 2012/0107714 A1 | 5/2012 | Day et al. | |
| 2012/0189943 A1 | 7/2012 | Campbell et al. | |
| 2013/0029252 A1 | 1/2013 | Lo et al. | |

FOREIGN PATENT DOCUMENTS

| | | |
|---|---|---|
| CN | 102810677 A | 12/2012 |
| CN | 102895984 A | 1/2013 |
| WO | WO2011116788 A1 | 9/2011 |

* cited by examiner

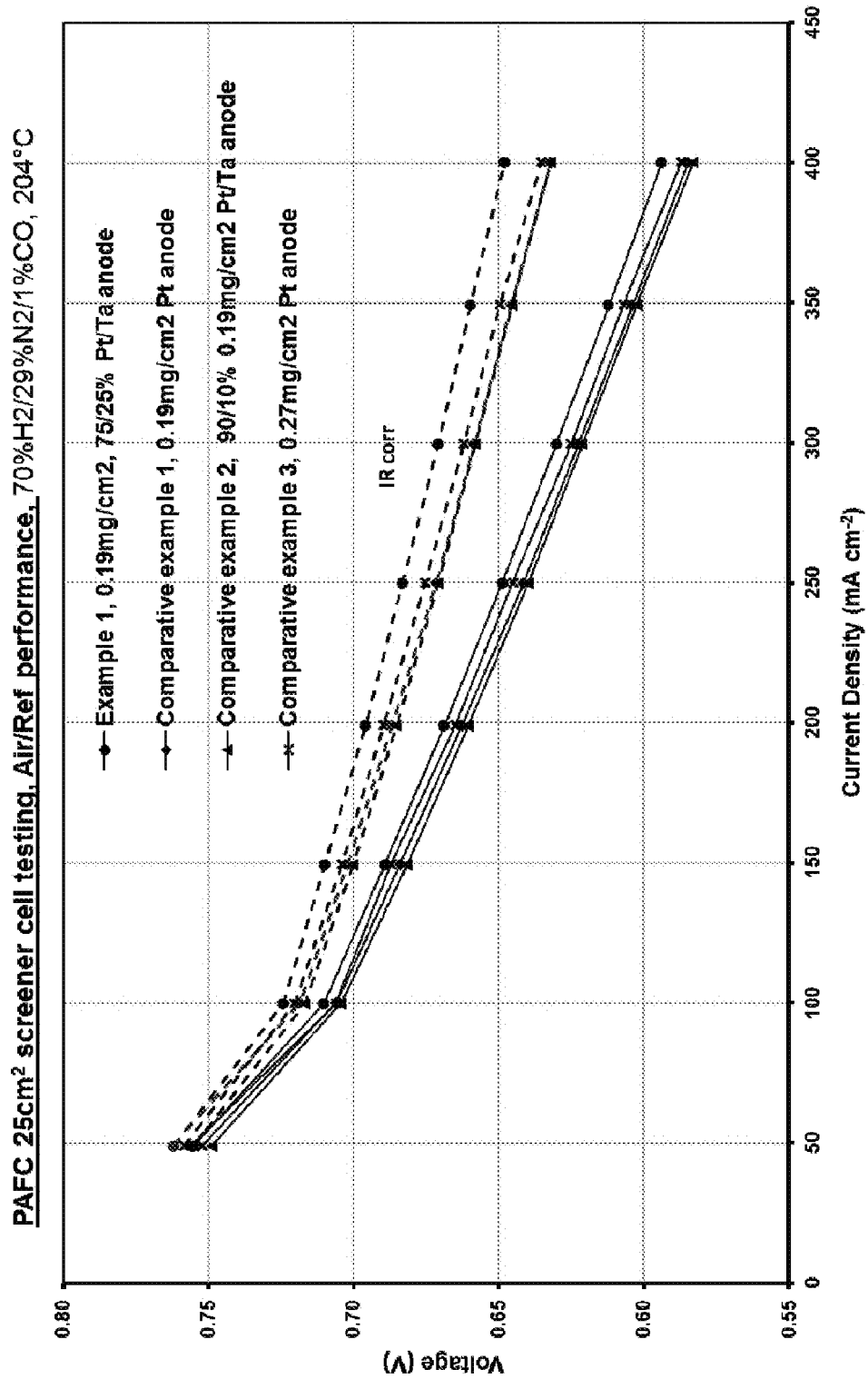
Polarisation data for Example 1 and Comparative Examples 1, 2 and 3 generated at 204°C with air at the cathode and a 70%H$_2$, 29%N$_2$, 1%CO reformate mixture provided to the anode.

CO-TOLERANT CATALYST FOR PAFC

FIELD OF THE INVENTION

The present invention relates to a novel catalyst, more specifically to a carbon monoxide tolerant catalyst for use in a gas diffusion electrode of a fuel cell using an acid electrolyte wherein proton conduction is carried out by materials such as phosphoric acid and/or polyphosphonic acid or materials comprising phosphonic acid functional groups.

BACKGROUND OF THE INVENTION

In a fuel cell a fuel, which is typically hydrogen or an alcohol, such as methanol or ethanol, is oxidised at a fuel electrode (anode) and oxygen, typically from air, is reduced at an oxygen electrode (cathode) to produce an electric current and form product water. An electrolyte is required which is in contact with both electrodes and which may be alkaline or acidic, liquid or solid. The liquid electrolyte phosphoric acid fuel cells operating at temperatures of 150° C.-210° C., were the first fuel cells to be commercialised and find application in the multi-megawatt utility power generation market and also in combined heat and power i.e. cogeneration systems, in the 50 to several hundred kilowatt range. More recently, fuel cells in which a phosphoric acid-doped polybenzimidazole membrane is used as the electrolyte have been utilised for power generation, typically in the 1-5 KW range, at temperatures in excess of 120° C.

To assist the oxidation and reduction reactions that take place at the anode and the cathode, catalysts are used. Precious metals, and in particular platinum, have been found to be the most efficient and stable electrocatalyst for fuel cells operating at temperatures below 300° C. The platinum electrocatalyst is typically provided as very small particles (~2-5 nm) of high surface area, which are often, but not always, distributed on and supported by larger macroscopic electrically conductive particles to provide a desired catalyst loading. Conducting carbons are typically the preferred material to support the catalyst.

For use in a phosphoric acid fuel cell, hydrogen-rich fuel gas is obtained by external reforming of hydrocarbons, such as natural gas. Such a process produces, in addition to hydrogen, a mixture of gases including carbon monoxide at a level of 1-2%. Carbon monoxide is known to poison a pure platinum catalyst, even at relatively low levels and at the temperatures at which the phosphoric acid fuel cell is operated. Thus, researchers have been investigating ways of reducing the carbon monoxide content of hydrogen fuel before it enters a fuel cell as a possible way to avoid poisoning the catalysts. However, extensive carbon monoxide reduction or clean-up processes invariably increase the size, complexity and cost of the fuel reformer system, often to prohibitive levels. An alternative simpler and more cost-effective solution is to provide a catalyst that is itself intrinsically more tolerant to carbon monoxide and achieving this has also been the subject matter of considerable research.

U.S. Pat. No. 5,183,713 discloses a platinum-tantalum alloyed supported catalyst comprising 2 to 50 weight % platinum deposited on a support. The platinum-tantalum alloyed catalyst comprises about 2 to about 10 atomic % tantalum. The preferred range of tantalum in the catalyst is between about 5 and 8 atomic %. The tantalum, at percentages above about 8 atomic %, covers part of the platinum surface thereby interfering with fuel reaction sites, while at percentages below about 2 atomic % it causes a decrease in the carbon monoxide tolerance to unacceptable levels.

SUMMARY OF THE INVENTION

It is the object of the present invention to provide a catalyst that demonstrates comparable or improved performance to state of the art catalysts in the presence of a fuel stream containing low levels of carbon monoxide, for example up to 4% carbon monoxide.

Accordingly, the present invention provides a binary alloy catalyst comprising platinum-tantalum, wherein the tantalum is present in the catalyst at 15 to 50 atomic %.

The invention further provides a method for the manufacture of the platinum-tantalum catalyst, and its use as the active component in an electrode of a fuel cell.

BRIEF DESCRIPTION OF THE DRAWINGS

FIG. 1 is a graph showing the polarisation data for Example 1 and Comparative Examples 1 to 3.

DETAILED DESCRIPTION OF THE INVENTION

Preferred and/or optional features of the invention will now be set out. Any aspects of the invention may be combined with any other aspects of the invention, unless the context demands otherwise. Any of the preferred or optional features of any aspect may be combined, singly or in combination, with any aspect of the invention, unless the context demands otherwise.

The invention provides a binary alloy catalyst comprising platinum-tantalum, wherein the tantalum is present in the catalyst at 15 to 50 atomic %.

Suitably, the tantalum is present in the catalyst at 20 to 45 atomic %, suitably 20 to 40 atomic %, suitably 20 to 35 atomic %, suitably 20 to 30 atomic %, suitably 22 to 28 atomic %, suitably 24 to 26 atomic %.

In the present context, "atomic %" means atomic percentage, i.e. the percentage based on atoms or moles of the total of platinum and tantalum; any additional non-metallic components (e.g. carbon) are not taken into consideration. By the term 'alloy' we mean that there is at least some interaction and incorporation of the tantalum metal into the platinum lattice, but the incorporation is not necessarily complete or uniform throughout the whole alloy particle. The atomic percentage of the metal in the alloy catalyst may be determined by standard procedures known to those skilled in the art; for example by wet chemical analysis digestion of the sample followed by inductively coupled plasma (ICP) emission spectroscopy.

The catalyst of the invention can be used in a fuel cell as an unsupported catalyst (e.g. as a metal black) or as a supported catalyst (i.e. dispersed on a support material).

Preferably the catalyst of the invention is used as a supported catalyst. Suitably the amount of the platinum-tantalum alloy is 5-15 wt % based on the weight of platinum versus the total weight of the supported catalyst, suitably 5-10 wt %. In a supported catalyst according to the present invention the platinum-tantalum alloy is suitably dispersed on a conductive high surface area support material, for example a conductive carbon, such as an oil furnace black, extra-conductive black, acetylene black or heat-treated or graphitised versions thereof, or carbon nanofibres or nanotubes. It may also be possible to use a non-conducting support material, such as inorganic metal oxide particles if the catalyst is deposited sufficiently well over the surface to provide the required electronic conductivity. The catalyst of the invention preferably consists essentially of the platinum-tantalum alloy dispersed on a conductive carbon material. Exemplary carbons include Akzo Nobel Ketjen EC300J (or the heat-treated or graphitised versions thereof), Cabot Vulcan XC72R (or the heat-treated or graphitised versions thereof) and Denka Acetylene Black.

The invention further provides a method for the manufacture of the platinum-tantalum alloy catalyst of the invention. The catalyst of the invention is prepared by adding a mixed solution containing compounds of each of platinum and tantalum to a dispersion of carbon at elevated temperature. Once the metal depositions have completed, the catalyst is recovered, for example by filtration, washed free of soluble ionic species and dried. A heat treatment process is carried out at a temperature of between 700° C. and 1000° C. in an inert atmosphere to form the catalyst. Alternatively, the platinum and tantalum solutions may be sequentially deposited onto the carbon support, followed by filtration, drying and heat treatment.

The catalyst of the invention has particular utility as the active component in an electrode of a fuel cell comprising an acid electrolyte wherein proton conduction is carried out by materials such as phosphoric acid and/or polyphosphonic acid or materials comprising phosphonic acid functional groups. Examples of such fuel cells include, but are not limited to: fuel cells, in which the electrolyte is liquid phosphoric acid held in a supporting matrix, for example a silicon carbide matrix; and fuel cells in which the electrolyte is a phosphoric acid-doped polybenzimidazole membrane. In the context of the present invention, all such fuel cells which comprise phosphoric acid materials as the electrolyte will be termed 'phosphoric acid fuel cells'. More specifically, the catalyst of the invention shows particular utility as the hydrogen oxidation catalyst when hydrogen contaminated with carbon monoxide (for example at a concentration of up to 4%) is used as the fuel.

Thus, a further aspect of the invention provides an electrode comprising a platinum-tantalum alloyed catalyst of the invention. In a preferred embodiment, the electrode is the anode. To form the electrode, a catalyst layer comprising the catalyst of the invention, mixed with a fluoropolymer binder such as polytetrafluoroethylene (PTFE), is applied to one side of a porous gas diffusion substrate using a range of well-established techniques, followed by drying and heating above the melting point of the polymer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc., or woven carbon cloths. The carbon paper, web or cloth may be provided with a further treatment prior to being used in an electrode either to make it more wettable (hydrophilic) or more wet-proofed (hydrophobic). The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer.

In a further embodiment of the invention, the catalyst of the invention is applied to a decal transfer substrate. Accordingly, a further aspect of the present invention provides a decal transfer substrate comprising a platinum-tantalum catalyst of the invention applied to a surface thereof. The transfer substrate may be any suitable transfer substrate known to those skilled in the art but is preferably a polymeric material such as polytetrafluoroethylene (PTFE) or polypropylene (especially biaxially-oriented polypropylene, BOPP) or a polymer-coated paper such as polyurethane coated paper. The transfer substrate could also be a silicone release paper or a metal foil such as aluminium foil. The catalyst of the invention may then be transferred to a gas diffusion substrate by techniques known to those skilled in the art.

For phosphoric acid fuel cell electrodes, the catalyst is usually mixed with an aqueous suspension of a hydrophobic fluoropolymer such as PTFE, to act as a polymeric binder, and the resultant flocculated material applied to the gas diffusion substrate or decal transfer substrate by techniques such as direct filtration, filter transfer, screen printing (as described in e.g. U.S. Pat. No. 4,185,131) or dry powder vacuum deposition (as described in U.S. Pat. No. 4,175,055).

The catalyst of the invention is suitably applied to the gas diffusion substrate or decal transfer substrate at a loading on the anode of between 0.1 mg/cm$^2$Pt and 0.35 mg/cm$^2$Pt, suitably between 0.15 mg/cm$^2$Pt and 0.35 mg/cm$^2$Pt and preferably between 0.15 mg/cm$^2$Pt and 0.25 mg/cm$^2$Pt. The catalyst of the invention is suitably applied to the gas diffusion substrate or decal transfer substrate at a loading on the cathode of between 0.2 mg/cm$^2$Pt to 0.8 mg/cm$^2$Pt, suitably 0.3 mg/cm$^2$Pt to 0.6 mg/cm$^2$Pt.

The catalyst of the invention is used in fuel cell comprising an acid electrolyte wherein proton conduction is carried out by materials such as phosphoric acid and/or polyphosphonic acid or materials comprising phosphonic acid functional groups; and in particular a phosphoric acid fuel cell. Accordingly, a further aspect of the invention provides a phosphoric acid fuel cell comprising an electrode, preferably an anode, of the invention. When in operation, a carbon-monoxide-containing hydrogen-fuel will be supplied to the anode (of the invention) and an oxidant to the cathode (a conventional cathode). More specifically, the invention provides a phosphoric acid fuel cell comprising an anode of the invention, a cathode and an electrolyte comprising phosphoric acid groups disposed between the anode and cathode, and wherein the anode of the fuel cell, when in operation, is supplied with a carbon monoxide-containing hydrogen fuel.

Also provided by the invention is a process for operating a phosphoric acid fuel cell, the process comprising: providing a phosphoric acid fuel cell, wherein the anode comprises a platinum-tantalum catalyst according to the invention; providing a fuel stream to the anode wherein the fuel stream comprises carbon monoxide; and operating the fuel cell at elevated temperature.

Typically, the fuel stream comprises up to 4% carbon monoxide, for example up to 2% carbon monoxide. Typically, the fuel stream comprises at least 0.5% carbon monoxide.

By elevated temperature is meant a temperature equal to or greater than about 120° C. The maximum temperature at which a phosphoric acid fuel cell is operated is about 220° C.

The invention will now be described in more detail with reference to the following examples, which are illustrative and not limiting of the invention.

Example 1: Preparation of Pt$_{75}$Ta$_{25}$ Catalyst

Carbon black (Cabot Vulcan XC72R) (180.4 g) was dispersed in water using a shear mixer and transferred to a reaction vessel. NaHCO$_3$ (143.8 g) was added to the slurry and the mixture heated to reflux. TaCl$_5$ (9.2 g) dissolved in concentrated hydrochloric acid was added to a chloroplatinic acid solution containing 15.0 g of Pt. The Pt/Ta solution was added to the refluxing carbon black suspension. When deposition of the metals was completed the catalyst was recovered by filtration and washed on the filter bed with demineralised water until free of soluble ions. The material was dried and then annealed at high temperature (e.g. 800° C.) in an inert atmosphere. Final analysis was carried out by wet chemical digestion of samples and ICP-MS on the resultant metal solutions to determine the metal assay. The degree of sample uniformity and alloying was assessed using X-Ray Diffraction (XRD) analysis. A nominal Pt$_{75}$Ta$_{25}$ catalyst (i.e. 75 atomic % Pt, 25 atomic % Ta) was obtained with a nominal loading of 7.5 wt % Pt on carbon.

Comparative Example 1: Platinum Catalyst

Using an analogous process to that described for Example 1, a Pt catalyst was obtained with a nominal loading of 10 wt % Pt on Cabot Vulcan XC72R carbon black.

Comparative Example 2: Preparation of Pt$_{90}$Ta$_{10}$ Catalyst

Using an analogous process to that described for Example 1, a nominal Pt$_{90}$Ta$_{10}$ catalyst (i.e. 90 atomic % Pt, 10 atomic % Ta) was obtained with a nominal loading of 7.4 wt % Pt on Cabot Vulcan XC72R carbon black.

Comparative Example 3: Platinum Catalyst

Comparative Example 3 used the same catalyst as in Comparative Example 1.

Preparation of Electrode and Testing

Electrodes were prepared using Comparative Examples 1, 2 and 3 and Example 1 as anode catalysts. The same process was used for the preparation of the electrodes.

All catalysts were added to an aqueous dispersion of PTFE at a constant ratio of PTFE to the carbon support to create a floc before being mixed at high shear. The inks were then filtered and dried, before a dry powder deposition process was employed to deposit the anode catalyst onto a non-woven graphitised substrate which was subsequently heated above the PTFE melting temperature. Table 1 shows the loading of Pt in the anodes.

TABLE 1

| Electrode Number | Catalyst | Loading of Pt in the anode |
| --- | --- | --- |
| Example 1 | 75/25 at % Pt/Ta/C | 0.19 mg/cm$^2$ |
| Comparative Example 1 | Pt/C | 0.19 mg/cm$^2$ |
| Comparative Example 2 | 90/10 at % Pt/Ta/C | 0.19 mg/cm$^2$ |
| Comparative Example 3 | Pt/C | 0.27 mg/cm$^2$ |

The electrodes were then paired with a state of the art cathode comprising a Pt/Co/Cr ternary alloy catalyst in between a SiC matrix and doped with the same known amount of phosphoric acid to form an integrated single phosphoric acid fuel cell electrode assembly. The assembly was placed either side of metal flow field plates to build a complete single fuel cell. Each cell was then conditioned for 15 hrs at 100 mA/cm$^2$ and a polarisation curve was generated at 204° C. with air at the cathode and a reformate fuel stream containing 70% H$_2$, 29% N$_2$, 1% CO fed to the anode. The cell polarisation results are shown in FIG. 1.

Comparative Examples 1 and 2 and Example 1 each have the same platinum loading in the anode. Comparative Examples 1 and 2 demonstrate very similar performance but Example 1 using the Pt/Ta alloy of the invention clearly demonstrates an improvement across the current density range realising a 10 mV improvement in fuel cell output at the 300 mA/cm$^2$ operational current density. Once corrected for ohmic resistance the kinetic improvement is in the 15 mV range.

Comparative Example 3 has a higher platinum loading in the anode than Example 1; however, Example 1 again demonstrates an improvement across the current density range.

The higher cell voltage achieved by Example 1 of the invention provides for a significantly higher electrical efficiency output from the fuel cell.

The invention claimed is:

1. A catalyst comprising a binary alloy comprising platinum and tantalum, wherein the tantalum is present in the binary alloy at 15 to 50 atomic % and a high surface area conductive carbon support material, wherein the binary alloy is dispersed on the support material at a loading of 5-15 wt % based on the weight of platinum versus the total weight of the catalyst.

2. An electrode comprising the catalyst according to claim 1.

3. An electrode according to claim 2, wherein the electrode is the anode.

4. A phosphoric acid fuel cell comprising an electrode according to claim 2.

5. A phosphoric acid fuel cell comprising an anode according to claim 3, a cathode and a phosphoric acid electrolyte disposed between the anode and cathode, and wherein the anode of the fuel cell, when in operation, is supplied with a carbon monoxide-containing hydrogen fuel.

6. A phosphoric acid fuel cell according to claim 5, in which the electrolyte is liquid phosphoric acid held in a supporting matrix.

7. A phosphoric acid fuel cell according to claim 5, in which the electrolyte is a phosphoric acid-doped polybenzimidazole membrane.

8. A process for operating a phosphoric acid fuel cell, the process comprising: providing a phosphoric acid fuel cell, comprising an anode, wherein the anode comprises a catalyst according to claim 1; providing a fuel stream to the anode wherein the fuel stream comprises carbon monoxide; and operating the fuel cell at elevated temperature.

9. The process according to claim 8, wherein the fuel stream comprises up to 4% carbon monoxide.

10. The process according to claim 8, wherein the fuel stream comprises at least 0.5% carbon monoxide.

11. The process according to claim 8, wherein the fuel cell is operated at a temperature equal to or greater than about 120° C.

12. The catalyst according to claim 1, wherein the high surface area conductive carbon support material is selected from the group consisting of oil furnace black, extra-conductive black, acetylene black, heat-treated acetylene black, graphitised acetylene black, carbon nanofibres and carbon nanotubes.

* * * * *